United States Patent
Woo

(10) Patent No.: US 9,726,102 B2
(45) Date of Patent: Aug. 8, 2017

(54) METHOD OF LIMITING MAXIMUM SPEED OF VEHICLE

(71) Applicant: HYUNDAI MOTOR COMPANY, Seoul (KR)

(72) Inventor: Nam Gyu Woo, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 49 days.

(21) Appl. No.: 14/963,911

(22) Filed: Dec. 9, 2015

(65) Prior Publication Data

US 2017/0058813 A1 Mar. 2, 2017

(30) Foreign Application Priority Data

Aug. 24, 2015 (KR) .................. 10-2015-0118857

(51) Int. Cl.
| | | |
|---|---|---|
| *F02D 41/24* | (2006.01) | |
| *B60W 10/06* | (2006.01) | |
| *B60W 30/188* | (2012.01) | |
| *B60W 50/10* | (2012.01) | |
| *B60W 50/12* | (2012.01) | |

(52) U.S. Cl.
CPC ......... *F02D 41/2487* (2013.01); *B60W 10/06* (2013.01); *B60W 30/188* (2013.01); *B60W 50/10* (2013.01); *B60W 50/12* (2013.01); *B60W 2520/105* (2013.01); *B60W 2540/04* (2013.01); *B60W 2710/0627* (2013.01); *B60W 2710/0644* (2013.01); *B60W 2720/12* (2013.01); *B60Y 2300/188* (2013.01); *F02D 2200/501* (2013.01); *F02D 2200/702* (2013.01)

(58) Field of Classification Search
CPC ............. F02D 41/24; F02D 41/2487; F02D 2200/702; F02D 2200/501; B60W 10/06; B60W 50/10; B60W 30/188; B60W 50/12; B60W 2540/04; B60W 2520/105; B60W 2710/0644; B60W 2710/0627; B60W 2720/12
See application file for complete search history.

(56) References Cited

U.S. PATENT DOCUMENTS

| | | | |
|---|---|---|---|
| 6,240,356 B1 * | 5/2001 | Lapke ................. | B60K 31/04 701/102 |
| 6,367,446 B1 * | 4/2002 | Kanamaru .......... | F02D 31/003 123/339.12 |

FOREIGN PATENT DOCUMENTS

| | | | | |
|---|---|---|---|---|
| JP | H09-249052 A | 9/1997 | | |
| JP | 10-044828 A | 2/1998 | | |
| JP | 10103125 A | * 4/1998 | ............. | F02D 41/04 |
| JP | 2005-171816 A | 6/2005 | | |
| JP | 2005-214060 A | 8/2005 | | |
| JP | 2015-206303 A | 11/2015 | | |
| KR | 10-2002-0096240 A | 12/2002 | | |

(Continued)

*Primary Examiner* — Hieu T Vo
(74) *Attorney, Agent, or Firm* — McDermott Will & Emery LLP

(57) ABSTRACT

A method of limiting a maximum speed of a vehicle comprises steps of changing a set speed of the vehicle; tuning a fuel injection map according to the change in the set speed; changing the amount of injected fuel to a predetermined percentage of the maximum amount of injected fuel based on the fuel injection map when the driving speed of the vehicle reaches the set speed level; and changing the speed of the vehicle according to a gradient of a road or whether the vehicle is loaded.

8 Claims, 6 Drawing Sheets

(56) References Cited

FOREIGN PATENT DOCUMENTS

KR    10-2008-0042359 A    5/2008
KR    10-2013-0121386 A    11/2013

\* cited by examiner

| RPM | 1000 | 1100 | 1200 | 1300 | 1400 | 1500 | 1600 | 1700 | 1800 | 1900 | 2000 |
|---|---|---|---|---|---|---|---|---|---|---|---|
| Fuel injection ratio (%) | 100 | 100 | 100 | 100 | 100 | 100 | 100 | 100 | 100 | 100 | 100 |
| | 90 | 90 | 90 | 90 | 90 | 90 | 90 | 90 | 90 | 90 | 90 |
| | 80 | 80 | 80 | 80 | 80 | 80 | 80 | 80 | 80 | 80 | 80 |
| | 70 | 70 | 70 | 70 | 70 | 70 | 70 | 70 | 70 | 70 | 70 |
| | 60 | 60 | 60 | 60 | 60 | 60 | 60 | 60 | 60 | 60 | 60 |
| | 50 | 50 | 50 | 50 | 50 | 50 | 50 | 50 | 50 | 50 | 50 |
| | 40 | 40 | 40 | 40 | 40 | 40 | 40 | 40 | 40 | 40 | 40 |
| | 30 | 30 | 30 | 30 | 30 | 30 | 30 | 30 | 30 | 30 | 30 |
| | 20 | 20 | 20 | 20 | 20 | 20 | 20 | 20 | 20 | 20 | 20 |
| | 10 | 10 | 10 | 10 | 10 | 10 | 10 | 10 | 10 | 10 | 10 |

- Existing fuel injection map -

Additional Map

| RPM | 1000 | 1100 | 1200 | 1300 | 1400 | 1410 | 1480 | 1500 | 1600 | 1700 | 1800 | 1900 | 2000 |
|---|---|---|---|---|---|---|---|---|---|---|---|---|---|
| Fuel injection ratio (%) | 100 | 100 | 100 | 100 | 100 | 100 | 0 | 100 | 100 | 100 | 100 | 100 | 100 |
| | 90 | 90 | 90 | 90 | 90 | 90 | 0 | 90 | 90 | 90 | 90 | 90 | 90 |
| | 80 | 80 | 80 | 80 | 80 | 80 | 0 | 80 | 80 | 80 | 80 | 80 | 80 |
| | 70 | 70 | 70 | 70 | 70 | 70 | 0 | 70 | 70 | 70 | 70 | 70 | 70 |
| | 60 | 60 | 60 | 60 | 60 | 60 | 60 | 60 | 60 | 60 | 60 | 60 | 60 |
| | 50 | 50 | 50 | 50 | 50 | 50 | 50 | 50 | 50 | 50 | 50 | 50 | 50 |
| | 40 | 40 | 40 | 40 | 40 | 40 | 40 | 40 | 40 | 40 | 40 | 40 | 40 |
| | 30 | 30 | 30 | 30 | 30 | 30 | 30 | 30 | 30 | 30 | 30 | 30 | 30 |
| | 20 | 20 | 20 | 20 | 20 | 20 | 20 | 20 | 20 | 20 | 20 | 20 | 20 |
| | 10 | 10 | 10 | 10 | 10 | 10 | 10 | 10 | 10 | 10 | 10 | 10 | 10 |

- Fuel injection map according to change in set speed -

METHOD OF LIMITING MAXIMUM SPEED OF VEHICLE

CROSS-REFERENCE TO RELATED APPLICATION

This application claims under 35 U.S.C. §119(a) the benefit of priority to Korean Patent Application No. 10-2015-0118857, filed on Aug. 24, 2015, the entirety of which is incorporated herein by reference.

TECHNICAL FIELD

The present disclosure relates to a method of limiting the maximum speed of a vehicle. More particularly, it relates to a method of limiting the maximum speed of a vehicle in which the fuel ratio and the driving efficiency can be improved by changing a scheme for limiting the maximum speed of the vehicle.

BACKGROUND

In general, the maximum speeds for commercial vehicles (trucks, buses, and the like) are limited by rules. For example, in Korea, the maximum speed of trucks is limited to 90 KPH, the maximum speed of coaches is limited to 110 KPH, and the maximum speed of intra-city buses is limited to 80 KPH.

The legal maximum speed limit of Korean trucks is 90 KPH, and the maximum speed of 90 KPH means that the vehicles of the manufacturers should never exceed the speed limit of 90.0 KPH and are tuned to have a maximum speed in a range of 87.5 KPH to 88.9 KPH.

Some other countries do not limit the maximum speeds of vehicles by such rules, and the maximum speeds of trucks are set to an higher limit (for example, 120 KPH) so as not to reach a tire speed limit (for example, 130 KPH).

Hereinafter, a method of controlling fuel injection for limiting the maximum speed of a lorry according to the related art will be described with reference to FIG. 1.

As illustrated in FIG. 1, if the actual maximum speed of a vehicle exceeds a tuning upper limit and reaches a maximum speed limit, an engine Electronic Control Unit (ECU) performs a fuel cut control such that the vehicle may not be further accelerated.

Furthermore, when the vehicle is accelerated through fuel injection at a tuning lower limit (for example, 87.5 KPH), the amount of injected fuel is controlled such that the vehicle is slowly accelerated to prevent the driver from feeling an acceleration feeling (acceleration shock) by an abrupt acceleration.

Further, even when a fuel cut control is performed at an upper tuning limit (for example, 88.9 KPH) or higher, the speed of the vehicle may instantaneously increase up to 89.5 KPH by an inertial force or a resilient force due to the weight of the vehicle when the vehicle descends, but a fuel map is tuned such that the speed of the vehicle never exceeds 90 KPH.

However, the method of limiting the maximum speed of a vehicle according to the related art has the following problems.

Because vehicles (particularly, trucks) cannot exceed the maximum limit, they may not be accelerated to the maximum limit or higher on a downhill road and the driving speeds of the vehicles cannot be increased even when the vehicles are empty. This is because the drivers cannot arbitrarily set the maximum limits of the vehicles.

The maximum limits of the vehicles are fixed, but the fuel ratio would be improved due to an inertial driving force if the vehicles are accelerated to a degree on a downhill road. Accordingly, the fuel ratio may be improved by using elastic travel of the vehicles when an uphill road is present immediately after a downhill road, and the vehicles can be safely driven by decelerating the vehicles to a degree on a flat road after a downhill road. Driving performance and fuel ratio deteriorate when driving schemes fail to realize these advantages.

Because the actual maximum limit does not need to be restricted in some countries (for example, China) that do not have any maximum limit rules, the maximum limit (for example, 120 KPH) is set according to a tire allowable limit (for example, 130 KPH).

Because the driver can drive at a speed almost close to the maximum limit by setting the maximum limit to a very high value, it may be advantageous in driving efficiency, but fuel ratio deteriorates as driving speed increases.

Furthermore, because the driver drives the vehicle while being careful with the vehicle speed to improve fuel ratio, the driver should frequently check the speedometer.

Although the driving speeds of trucks, which have been produced in some countries (for example, China), have been significantly improved through high engine power, fuel ratio deteriorates due to high driving speed so that the employers (the owners of the vehicles) have complaints, and in contrast, the employed drivers tend to drive at as high speeds as possible because they want to take rests for a longer time.

SUMMARY

The present disclosure has been made in an effort to solve the above-mentioned problems, and it provides a method of limiting the maximum speed of a vehicle such that an employer (the owner of a vehicle) can arbitrarily adjust a maximum speed limiting scheme of the vehicle to improve fuel ratio in a country without a maximum speed limit rule and a driver can satisfy a desire by slightly increasing a driving speed in an empty state where the vehicle is not loaded and at a low gradient (on a flat or downhill road).

In accordance with an aspect of the present invention, a method of limiting a maximum speed of a vehicle comprises steps of: changing a set speed of the vehicle; tuning a fuel injection map according to the change in the set speed; changing the amount of injected fuel to a predetermined percentage of the maximum amount of injected fuel based on the fuel injection map when the driving speed of the vehicle reaches the set speed level; and changing the speed of the vehicle according to a gradient of a road or whether the vehicle is loaded.

The step of changing the set speed of the vehicle may comprise steps of: identifying whether the set speed is used after the vehicle is started; inputting a password to change the set speed; changing the set speed; inputting the password again after the set speed is changed; and selecting and storing the fuel injection map according to the change in the set speed.

An existing fuel injection map may be selected when the set speed is not used.

The fuel injection map may be a tuning map by which the output of the engine is lowered by controlling the amount of injected fuel to a predetermined percentage of the maximum amount of injected fuel when the vehicle speed reaches the set speed, and may be updated and stored in the engine ECU.

The step of changing the amount of injected fuel may comprise steps of: reducing an engine torque by controlling the amount of injected fuel to be about 60% to 70% of the maximum amount of injected fuel when a vehicle speed is greater than a buffer speed; and reducing the engine torque to a torque level generated by the amount of injected fuel of 60% to 70% when the vehicle speed reaches the set speed.

The step of changing the speed of the vehicle may comprise accelerating the vehicle to the set speed or higher by a marginal driving force of the engine when the road is a downhill road or a flat road having a small driving resistance.

The step of changing the speed of the vehicle may comprise decelerating the vehicle to the set speed or lower by lack of a marginal driving force of the engine when the road is an uphill road having a larger driving resistance.

In the step of changing the speed of the vehicle, the vehicle may be further accelerated to the set speed or higher by a marginal driving force of the engine when the vehicle is empty when the speed of the vehicle reaches the set speed.

The present inventive concept provides the following effects through the method.

First, because an employer (the owner of a vehicle) can arbitrarily adjust a set speed (maximum speed) of the vehicle in a country without a maximum speed limit rule, the employer can suppress an excessive speed increase to a set speed or higher to improve fuel ratio by controlling the amount of injected fuel to an arbitrary level (for example, 70% of the maximum amount of injected fuel) to decrease engine output if the vehicle reaches the set speed.

Second, because the driver can slightly accelerate the vehicle using an engine output corresponding to the amount of injected fuel (60% to 70%) of an arbitrary level on a flat or downhill road, the driver can satisfy a driving desire.

Third, fuel ratio can be prevented from deteriorating by suppressing an excessive acceleration while driving an uphill road.

BRIEF DESCRIPTION OF THE DRAWINGS

The above and other features of the present inventive concept will now be described in detail with reference to certain exemplary embodiments thereof illustrated by the accompanying drawings which are given herein below by way of illustration only, and thus are not limitative of the present invention, and wherein.

Figure 1:
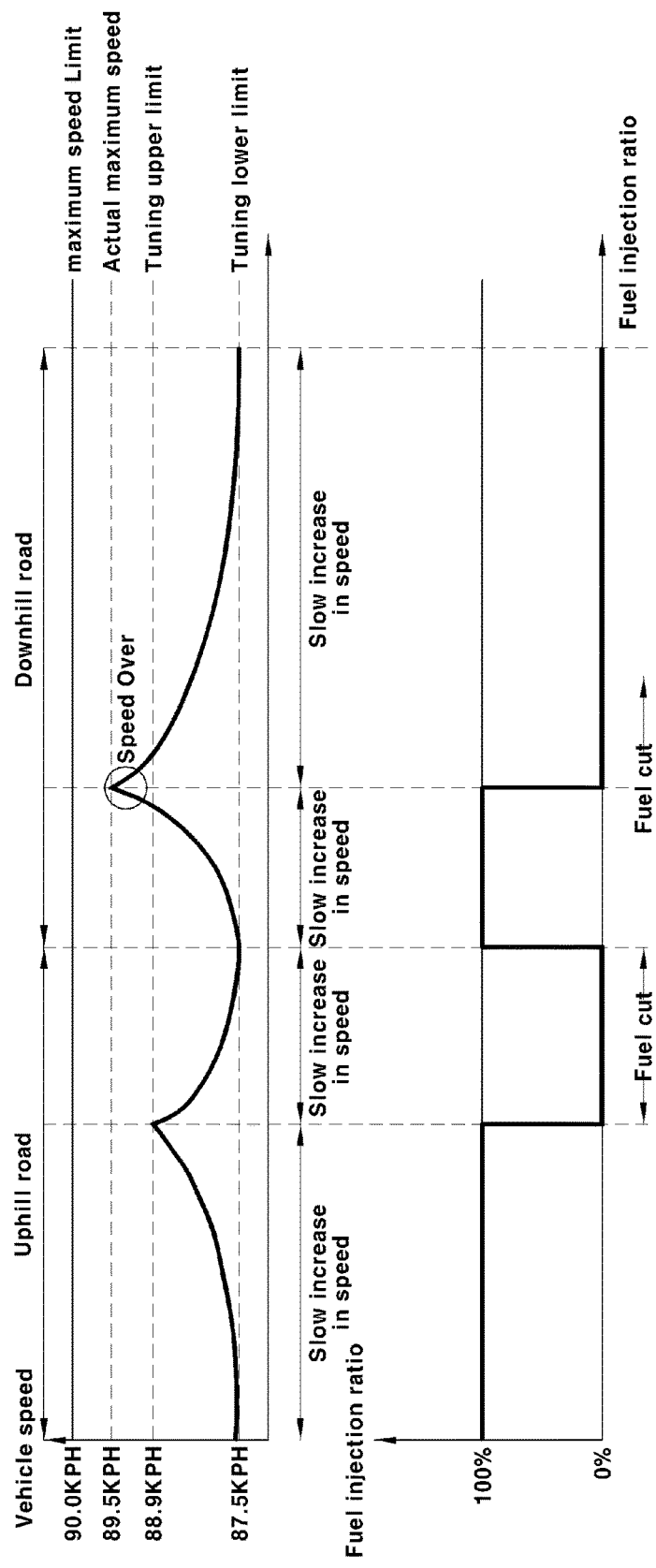
FIG. 1 is a graph illustrating a method of controlling fuel injection for limiting the maximum speed of a lorry according to the related art.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

First, the concept of the method of limiting the maximum speed of a vehicle according to the present invention will be described to help understanding of the present invention.

The method of limiting the maximum speed of a vehicle according to the related art is a scheme of preventing further acceleration of a vehicle by controlling the amount of fuel injected by an engine through a fuel-cut to "0" if the vehicle reaches the maximum speed.

Meanwhile, the main point of the method of limiting the maximum speed of a vehicle according to the present inventive concept is that the amount of injected fuel is not controlled to "0" but the output of the engine is lowered by controlling the amount of injected fuel to an arbitrary level (for example, about 60% to 70% of the maximum amount of injected fuel).

By controlling the amount of injected fuel to an arbitrary level (for example, 60% to 70% of the maximum amount of injected fuel) to lower the output of an engine, the employer (the owner of the vehicle) may realize an improvement in the fuel ratio by suppressing an excessive speed increase to a set speed or higher, the driver may satisfy a driving desire by accelerating the vehicle to a degree through the output of the engine corresponding to the amount of injected fuel of 60% to 70% of the maximum amount of injected fuel when the vehicle is driven on a flat or downhill road, and deterioration of fuel ratio can be prevented by suppressing an excessive increase of speed on an uphill road.

Here, an exemplary embodiment of the method of limiting the maximum speed of a vehicle according to the present invention will be described in more detail.

Figure 2:
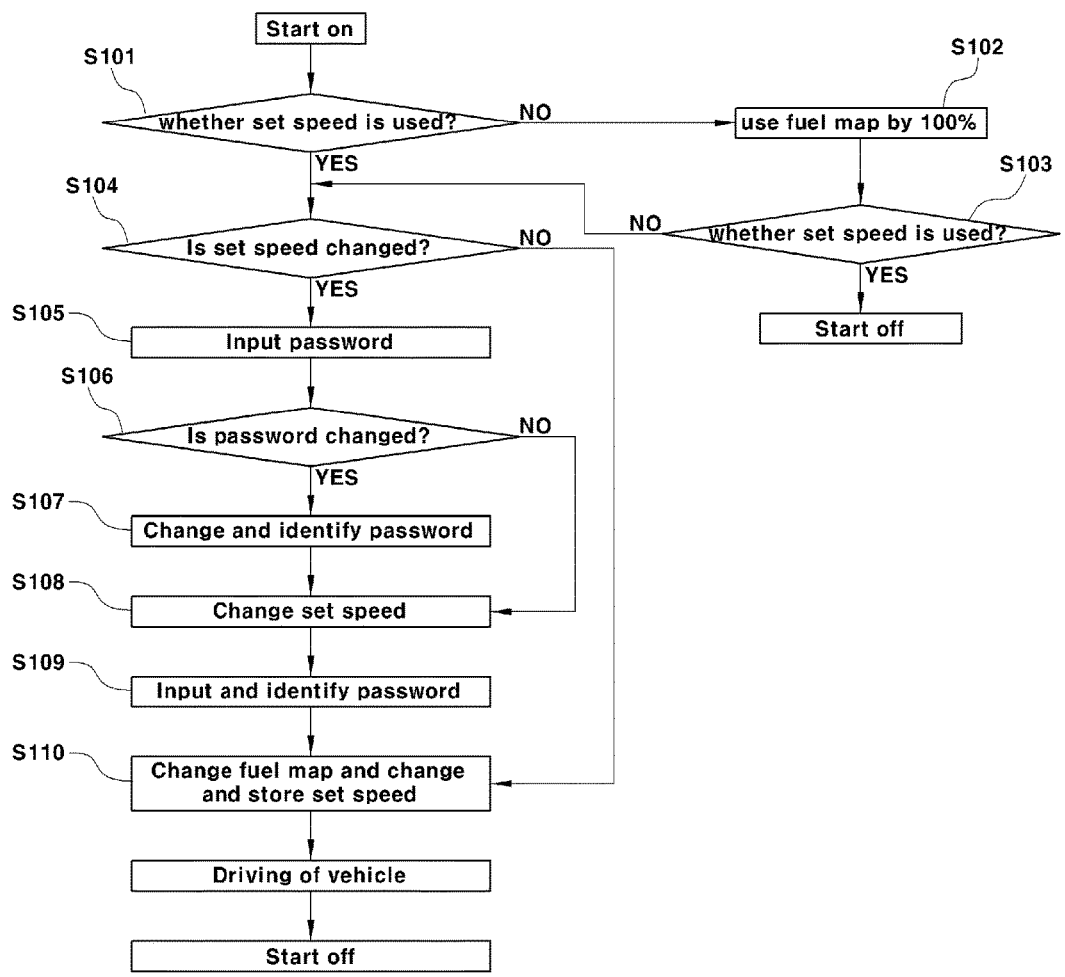
FIG. 2 is a flowchart illustrating an example of changing a set speed (maximum speed) of a vehicle as a step for a method of limiting the maximum speed of the vehicle according to the present invention.

First, the employer (the owner of the vehicle) changes a set speed (maximum speed) using a general engine ECU tuning and diagnosing device, and an example will be described with reference to the accompanying flowchart of FIG. 2.

After the vehicle is started, it is determined whether the employer (the owner of the vehicle) uses a set speed (S101).

If a set speed is not used, an existing fuel injection map is selected (S102), and whether a set speed is used may be determined again according to the intention of the employer even while the existing fuel injection map is used (S103).

If the set speed is used, it is identified whether the employer has an intention to change the set speed (S104).

A fuel injection map, which is different from the existing fuel injection map, is selected and stored (S110) according to a change in set speed. A step S105 of inputting a password to change a set speed by the employer is performed. Then, a step S106 of identifying whether the password is changed is performed. Step S107 identifies whether the password has been changed. Step S108 is performed to change a set speed, and step S109 of inputting a password again after the set speed is changed is performed.

The fuel injection map according to a change in the set speed is a tuning map by which the amount of injected fuel is not controlled to 0 if the vehicle speed reaches a speed set by the employer (the owner of the vehicle). The output of the engine is lowered by controlling the amount of injected fuel to an arbitrary level (for example, 60% to 70%) that is less than a maximum amount of injected fuel, and is updated and stored in the engine ECU.

Figure 3:
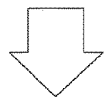
FIG. 3 is map data illustrating an example of constructing a fuel injection map according to a change in set speed as another step for the method of limiting the maximum speed of the vehicle according to the present invention.

Referring to FIG. 3, the fuel injection map according to a change in the set speed is obtained by adding an additional map to an existing fuel injection map.

For example, an additional map is added between engine RPMs of the existing fuel injection map, in which a low RPM (for example, 1410 of FIG. 3) of the additional map corresponds to a speed (for example, a set speed of 3 KPH) obtained by subtracting a speed buffer from the set speed and a high RPM (for example, 1480 of FIG. 3) corresponds to the set speed.

Accordingly, when the driving speed of the vehicle reaches a set speed level, a fuel injection control by the fuel injection map according to a change in set speed is performed so that the vehicle speed varies according to the gradient of the road.

For example, when the driving speed of the vehicle reaches a set speed level, the amount of fuel injected by the fuel injection map is controlled to be about 70% of the maximum amount of injected fuel so that the vehicle speed varies according to the gradient of the road.

That is, the speed of the vehicle starts to increase from a speed corresponding to a lower RPM (1410 of FIG. 3) of the additional map up to about 70% of the maximum amount of injected fuel such that the engine torque is gradually reduced. Subsequently, if the vehicle speed reaches a set speed corresponding to a high RPM (for example, 1480 of FIG. 3), the engine torque is fully reduced to an engine torque corresponding to an amount of injected fuel of about 70% level. Accordingly, the vehicle speed varies according to the gradient of the road.

Figure 4:
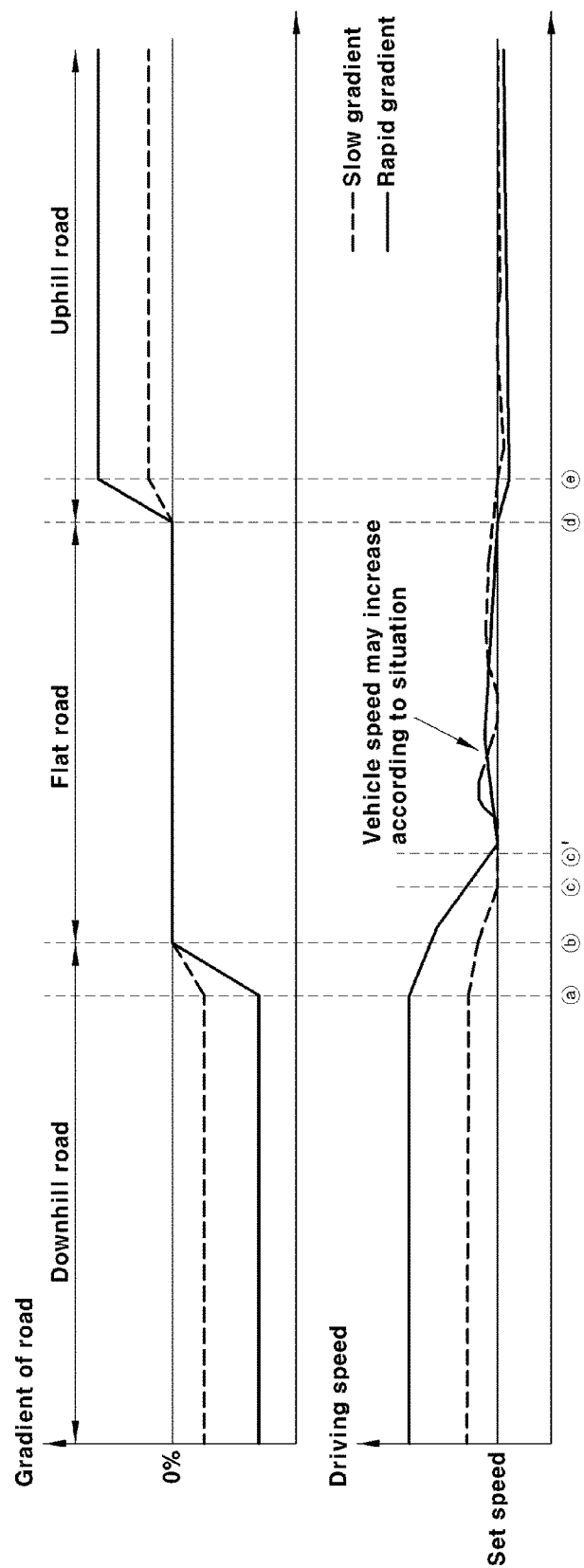
FIG. 4 is a graph illustrating a change in vehicle speed for gradients of roads based on the method of limiting the maximum speed of the vehicle according to the present invention.

Referring to FIG. 4, the engine output (torque) is reduced on a downhill road, but the vehicle speed accelerated to a set speed or higher because a marginal driving force is generated as a result of a reduction of a driving resistance due to downhill driving, and the degree of an increase in speed may be accurately determined according to how much the engine output is reduced.

In a flat road after a downhill road, because the engine output is reduced and the marginal driving force is reduced due to an increase of driving resistance, the vehicle speed is reduced to reach a set speed at a point ©/©' of FIG. 4 by the inertial force of the vehicle.

On an uphill road after a flat road, the speed of the vehicle is reduced as the engine output is reduced (for example, to 70%) at a speed corresponding to the set speed or higher and the vehicle is driven at an output of 100% at an RPM corresponding to a speed (for example, the speed buffer being 3 KPH) obtained by subtracting a speed buffer from the set speed, and as a result, the vehicle is driven at a speed slightly lower than the set speed on an uphill road.

Here, the principle of varying the speed of the vehicle according to the gradient of a road when the driving speed of the vehicle reaches a set speed level will be described below with reference to FIG. 5.

If the set speed is 80 KPH, the engine torque starts to be reduced from the speed of 77 KPH and is completely reduced at the speed of 80 KPH.

For example, the engine torque is gradually reduced as the amount of injected fuel reaches about 70% of the maximum amount of injected fuel from a vehicle speed (for example, the set speed (80 KPH)−3 KPH=77 KPH) corresponding to a lower RPM (1410 of FIG. 3) of the additional map of the fuel injection map according to the change in the set speed. Subsequently, if the vehicle speed reaches a set speed (for example, 80 KPH) corresponding to a high RPM (for example, 1480 of FIG. 3), the engine torque is reduced to a torque level generated by the amount of injected fuel of about 70%.

Figure 5:
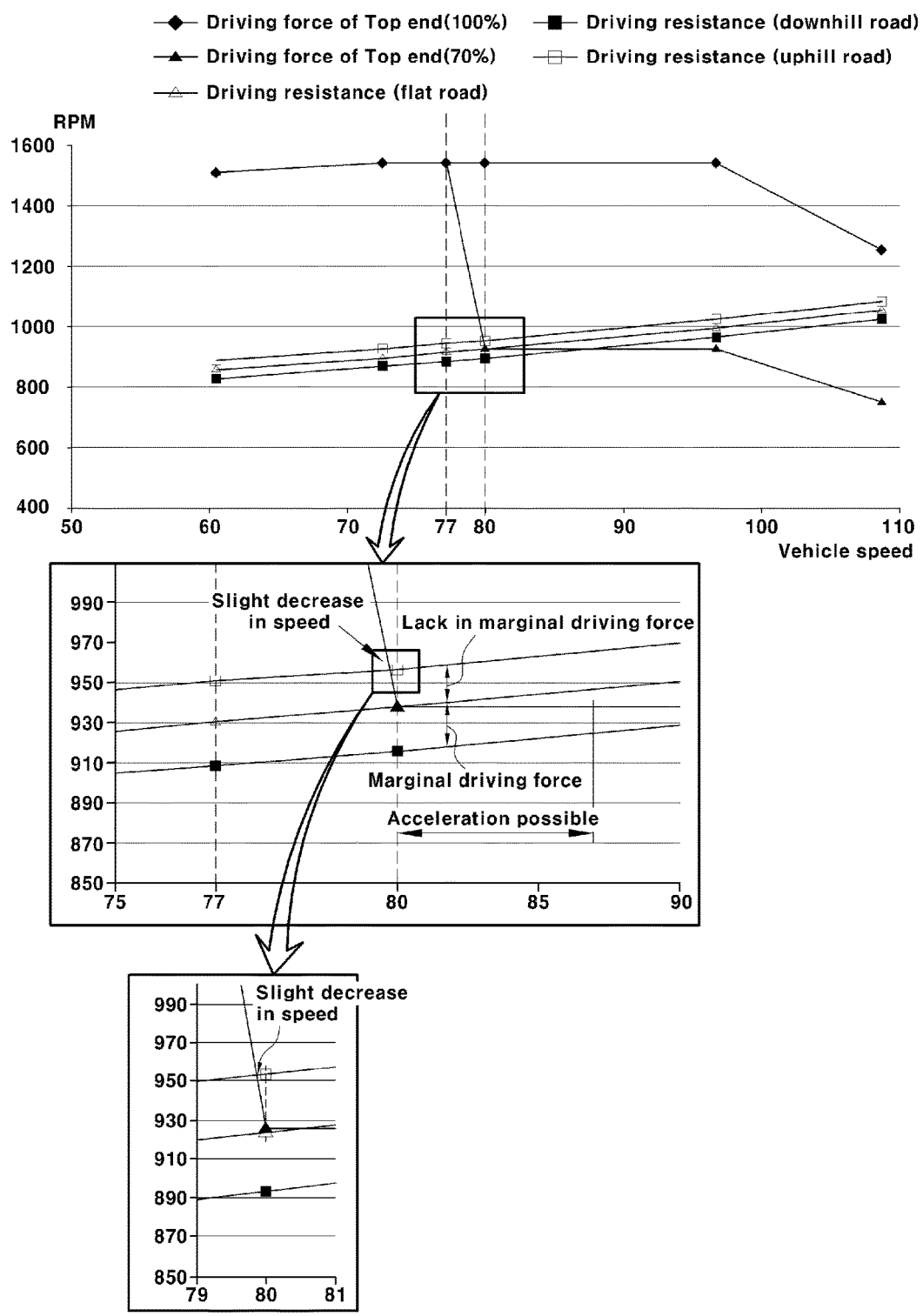
FIG. 5 is a graph illustrating the principle of a change in vehicle speed for gradients of roads based on the method of limiting the maximum speed of the vehicle according to the present invention in detail.

Because the driving resistance is small if the vehicle speed reaches the set speed (80 KPH) when the vehicle is driven on a downhill road, the marginal driving force of the engine is generated when the engine torque is reduced to a torque corresponding to the amount of injected fuel of about 70% of the maximum amount of injected fuel, as illustrated in FIG. 5. Thus, the vehicle may be accelerated to 88 KPH on a downhill road.

Because the driving resistance is larger when the vehicle is driven on an uphill road, the marginal driving force of the engine becomes insufficient when the engine torque is reduced to a torque corresponding to the amount of injected fuel of about 70% of the maximum amount of injected fuel, as illustrated in FIG. 5. The vehicle is thus driven at a speed (for example, 79.5 KPH) that is slightly lower than 80 KPH on an uphill road.

If the vehicle speed reaches the set speed (80 KPH) when the vehicle is driven on a flat road, the marginal driving force of the engine is small when the engine torque is reduced to a torque corresponding to the amount of injected fuel of about 70% of the maximum amount of injected fuel, as illustrated in FIG. 5. The vehicle may only be slightly accelerated at a speed exceeding 80 KPH.

In this way, the engine output may be lowered by controlling the amount of injected fuel to a predetermined percentage (for example, 70%) if the vehicle reaches the set speed. Thus, the employer (the owner of the vehicle) can improve the fuel ratio by suppressing an excessive speed increase to the set speed or higher, the driver can slightly accelerate the speed of the vehicle on a downhill road or the like, and deterioration of the fuel ratio is prevented by avoiding an excessive acceleration on an uphill road.

The vehicle speed may vary according to a change in driving resistance such as the material of a road (asphalt/cement), the kind of the tires, and the amount of loads.

The principle of varying the speed of the vehicle according to the presence of a load when the driving speed of the vehicle reaches a set speed level will be described below with reference to FIG. 6.

Figure 6:
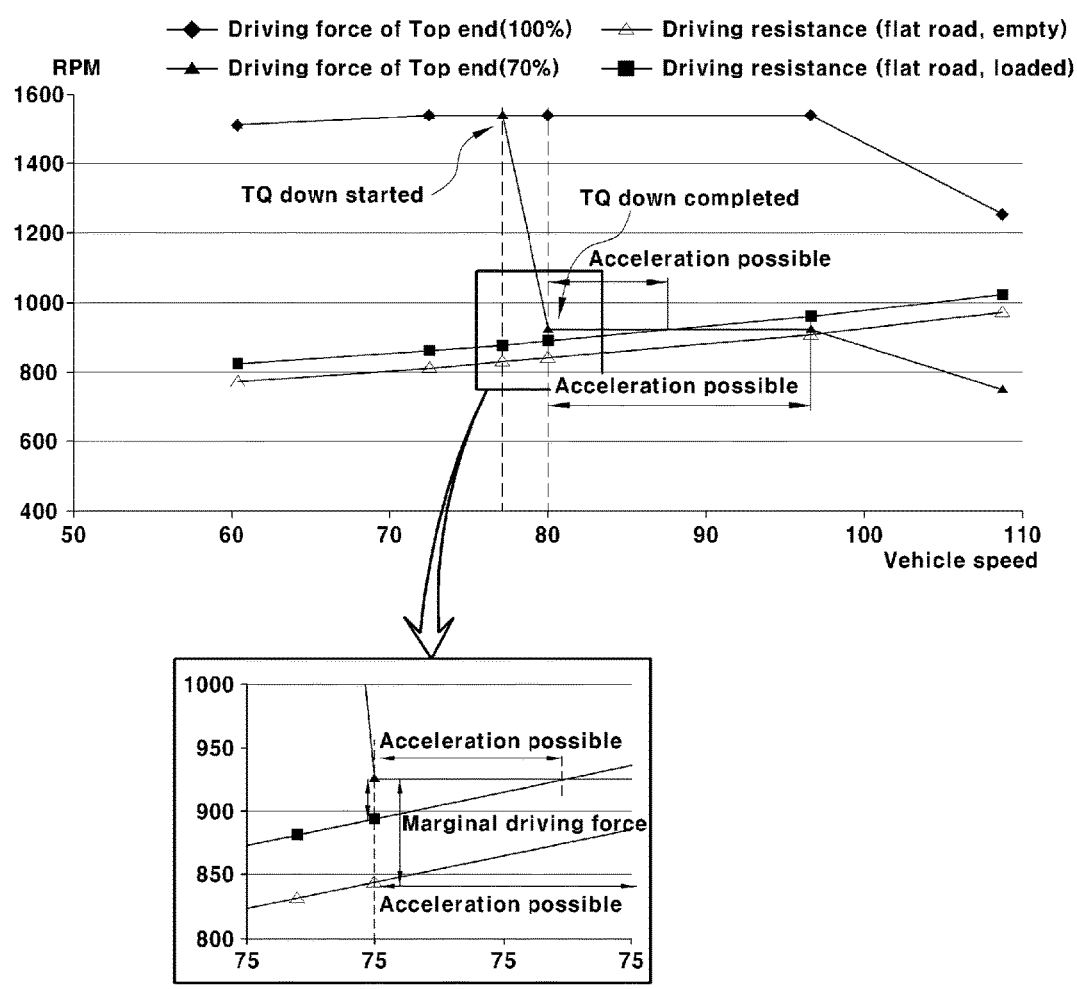
FIG. 6 is a graph illustrating that the vehicle speed is changed according to an empty or loaded state in a flat road driving condition based on the method of limiting the maximum speed of the vehicle according to the present invention.

FIG. 6 is a graph illustrating how the vehicle speed varies according to whether the vehicle is empty or loaded in a flat road condition.

If the set speed is 80 KPH, the engine torque starts to be reduced from the speed of 77 KPH and is completely reduced at the speed of 80 KPH.

When an empty vehicle is driven on a flat road, the driving resistance for the empty vehicle is small. Thus, even though the vehicle speed reaches the set speed (80 KPH), the marginal driving force of the engine is generated even at a time point when the engine torque is reduced to a torque corresponding to the amount of injected fuel of about 70% of the maximum amount of injected fuel as illustrated in FIG. 6, so that the vehicle may be further accelerated.

When a loaded vehicle is driven on a flat road, however, the driving resistance for the loaded vehicle is large. Thus, even though the vehicle speed reaches the set speed (80 KPH), the marginal driving force of the engine becomes rather small at a time point when the engine torque is reduced to a torque corresponding to the amount of injected fuel of about 70% of the maximum amount of injected fuel as illustrated in FIG. 6, so that the vehicle may be only slightly accelerated.

What is claimed is:

1. A method of limiting a maximum speed of a vehicle, the method comprising steps of:
    changing a set speed of the vehicle;
    tuning a fuel injection map according to the change in the set speed;
    changing the amount of injected fuel to a predetermined percentage of the maximum amount of injected fuel based on the fuel injection map when the driving speed of the vehicle reaches the set speed level; and
    changing the speed of the vehicle according to a gradient of a road or whether the vehicle is loaded.

2. The method of claim 1, wherein the step of changing the set speed of the vehicle comprises steps of:
    identifying whether the set speed is used after the vehicle is started;
    inputting a password to change the set speed;
    changing the set speed;
    inputting the password again after the set speed is changed; and
    selecting and storing the fuel injection map according to the change in the set speed.

3. The method of claim 2, wherein an existing fuel injection map is selected when the set speed is not used.

4. The method of claim 1, wherein the fuel injection map is a tuning map by which the output of the engine is lowered by controlling the amount of injected fuel to a predetermined percentage of the maximum amount of injected fuel when the vehicle speed reaches the set speed, and is updated and stored in the engine Electronic Control Unit (ECU).

5. The method of claim 1, wherein the step of changing the amount of injected fuel comprises steps of:
    reducing an engine torque by controlling the amount of injected fuel to be about 60% to 70% of the maximum amount of injected fuel when a vehicle speed is greater than a buffer speed; and
    reducing the engine torque to a torque level generated by the amount of injected fuel of 60% to 70% when the vehicle speed reaches the set speed.

6. The method of claim 1, wherein the step of changing the speed of the vehicle comprises accelerating the vehicle to the set speed or higher by a marginal driving force of the engine when the road is a downhill road or a flat road having a small driving resistance.

7. The method of claim 1, wherein the step of changing the speed of the vehicle comprises decelerating the vehicle to the set speed or lower by lack of a marginal driving force of the engine when the road is an uphill road having a larger driving resistance.

8. The method of claim 1, wherein in the step of changing the speed of the vehicle, the vehicle is further accelerated to the set speed or higher by a marginal driving force of the engine when the vehicle is empty when the speed of the vehicle reaches the set speed.

* * * * *